(12) United States Patent
Mu et al.

(10) Patent No.: US 8,189,644 B2
(45) Date of Patent: May 29, 2012

(54) HIGH-EFFICIENCY HO:YAG LASER

(75) Inventors: Xiaodong Mu, Sunnyvale, CA (US);
Helmuth E. Meissner, Pleasanton, CA (US)

(73) Assignee: Onyx Optics, Inc., Dublin, CA (US)

( * ) Notice: Subject to any disclaimer, the term of this patent is extended or adjusted under 35 U.S.C. 154(b) by 0 days.

(21) Appl. No.: 12/767,590

(22) Filed: Apr. 26, 2010

(65) Prior Publication Data

US 2010/0272130 A1 Oct. 28, 2010

Related U.S. Application Data

(60) Provisional application No. 61/173,052, filed on Apr. 27, 2009, provisional application No. 61/175,359, filed on May 4, 2009.

(51) Int. Cl.
*H01S 3/091* (2006.01)

(52) U.S. Cl. ............ 372/71; 372/10; 372/43.01; 372/72

(58) Field of Classification Search .................... 372/10, 372/43.01, 71, 72
See application file for complete search history.

(56) References Cited

U.S. PATENT DOCUMENTS

| | | | | |
|---|---|---|---|---|
| 4,703,491 A * | 10/1987 | Lim | ................................. | 372/93 |
| 5,084,840 A * | 1/1992 | Kozlovsky et al. | ........... | 365/106 |
| 5,651,021 A * | 7/1997 | Richard et al. | .................. | 372/92 |
| 5,936,984 A | 8/1999 | Meissner et al. | | |
| 6,025,060 A | 2/2000 | Meissner | | |
| 2003/0142706 A1 * | 7/2003 | Kartner et al. | ............. | 372/29.02 |
| 2005/0117620 A1 * | 6/2005 | Thro et al. | ........................ | 372/70 |
| 2005/0152426 A1 * | 7/2005 | Dell'Acqua et al. | ............ | 372/69 |
| 2005/0169335 A1 * | 8/2005 | Gao et al. | .......................... | 372/49 |
| 2006/0146901 A1 * | 7/2006 | Budni | ................................. | 372/39 |
| 2007/0201532 A1 * | 8/2007 | Zhang et al. | ...................... | 372/93 |
| 2008/0075131 A1 * | 3/2008 | Shahine | ..................... | 372/29.011 |
| 2008/0080584 A1 * | 4/2008 | Coyle | ................................. | 372/92 |
| 2008/0151946 A1 * | 6/2008 | Zafrani et al. | ................... | 372/11 |
| 2008/0247425 A1 * | 10/2008 | Welford | ........................... | 372/10 |
| 2009/0237777 A1 | 9/2009 | Meissner et al. | | |

OTHER PUBLICATIONS

Budni, P.A. et al., "50-mJ, Q-switched, 2.09-μm holmium laser resonantly pumped by a diode-pumped 1.9-μm thulium laser," *Optics Letters*, Jun. 15, 2003, vol. 28, No. 12, pp. 1016-1018.
Hart, D.W. et al., "Room-temperature lasing of end-pumped $Ho:Lu_3Al_5O_{12}$," *Optics Letters*, May 15, 1996, vol. 21, No. 10, pp. 728-730.
Khosrofian, J.M. et al., "Measurement of a Gaussian laser beam diameter through the direct inversion of knife-edge data," *Applied Optics*, Nov. 1, 1983, vol. 22, No. 21. pp. 3406-3410.

(Continued)

*Primary Examiner* — Yuanda Zhang
(74) *Attorney, Agent, or Firm* — Kilpatrick Townsend & Stockton LLP (57) ABSTRACT

A laser assembly and method of operating the assembly are described in which a pump beam is directed through an end-pumped solid-state laser gain medium four or more times. The pump beam is directed at a slight angle through a first end of the medium, reflects off the inner surface of the second, opposite end (to form a "V"), and then reflected by an external or integrated mirror back through the first end and off the inner surface of the opposite end again (back through the "V").

19 Claims, 8 Drawing Sheets

OTHER PUBLICATIONS

Koechner, W., *Solid-State Laser Engineering, Sixth Revised and Updated Edition*, 2006, W.T. Rhodes et al., eds., Springer Science+Business Media, Inc.: New York, publication and Table of Contents pages, 14 pages.

Lippert, E. et al., "Midinfrared laser source with high power and beam quality," *Applied Optics*, Jun. 1, 2006, vol. 45, No. 16, pp. 3839-3845.

So, S. et al., "High-power slab-based Tm:YLF laser for in-band pumping of Ho:YAG," *Proc. of SPIE*, vol. 6871, 2008, 68710R-1-68710R-10.

Sato, A. et al., "Double-Pass-Pumped Tm:YAG Laser with a Simple Cavity Configuration," *Applied Optics*, Sep. 20, 1998, vol. 37, No. 27, pp. 6395-6400.

Taira, T. et al., "Diode-Pumped Tunable Yb:YAG Miniature Lasers at Room Temperature: Modeling and Experiment," *IEEE Journal of Selected Topics in Quantum Electronics*, Feb. 1997, vol. 3, No. 1, pp. 100-104.

* cited by examiner

HIGH-EFFICIENCY HO:YAG LASER

CROSS-REFERENCES TO RELATED APPLICATIONS

This application claims the benefit of U.S. Provisional Application No. 61/173,052, filed Apr. 27, 2009, and U.S. Provisional Application No. 61/175,359, filed May 4, 2009. The applications above are hereby incorporated by reference for all purposes.

STATEMENT AS TO RIGHTS TO INVENTIONS MADE UNDER FEDERALLY SPONSORED RESEARCH OR DEVELOPMENT

NOT APPLICABLE

BACKGROUND

1. Field of the Art

Systems and methods are disclosed for a coherent light generator including an end-pumped laser in which the active media is excited by optical or radiant energy directed through an end surface of the active media, or including a resonant cavity in which laser action takes place by the build-up of electromagnetic field intensity upon multiple reflections. Specifically, novel four-pass end-pump configurations for solid-state lasers are disclosed.

2. Discussion of the Related Art

Directed energy generated by a laser (light amplification by stimulated emission of radiation) is used in many industries for many purposes. Lasers can be used for measuring, spectroscopy, directing, heating, ablating, marking, welding, cutting, pumping other lasers or nonlinear optical crystals, and other uses.

Solid-state lasers typically use a laser gain medium comprising a crystalline solid doped with ions. A common crystalline solid for solid-state lasers is yttrium aluminium garnet (YAG). Dopants include holmium, neodymium, chromium, erbium, ytterbium, cerium, thulium, dysprosium, samarium, and terbium among others. Other laserable media include single crystalline, optical ceramics and glasses. Among single and/or optical ceramic crystal media, other garnet crystals besides YAG can sometimes be equally applicable to embodiments. In addition, crystalline media include yttrium vanadate ($YVO_4$), yttrium aluminate ($YAlO_3$), lithium yttrium tetrafluoride ($LiYF_4$), ZnSe, ZnS, and sapphire. Glasses that can be applicable to embodiments include phosphate, silicate, and fluoride-based glasses.

In a laser, the laser gain medium is "pumped" or otherwise subjected to electromagnetic radiation in order to stimulate the medium to produce laser radiation. An arc lamp, flashlamp, diode, or another laser can be used as a pump, among other devices, to pump a laser gain medium.

Laser radiation is emitted from the laser gain medium when the lasing threshold of the bulk of the medium is reached. The lasing threshold is the lowest excitation level at which a laser medium's output radiation is dominated by stimulated emission rather than by spontaneous emission. Based on an energy level diagram of the laser materials, the lasing process can be understood through the familiar three-level or four-level idealizations. For a three-level laser system, the laser gain medium can be in-band pumped with low quantum defect. However, the three-level laser system can suffer re-absorption loss. In order to overcome the re-absorption loss, a high pump intensity is often required.

End-pumped solid-state lasers have an elongated laser gain medium and are typically pumped longitudinally from one or both ends. End-pumped lasers have been designed such that a pump laser's energy is projected from one end of the laser gain medium to the opposing end. End-pumped lasers have also been designed such that a pump laser's energy is projected from one end of the laser gain medium to the opposing end, which is coated for high reflectance at the pump beam's frequency. What remains of the pump energy at the opposing end is reflected off the end back through the laser gain medium. This double-pass approach results in higher laser extraction efficiency (i.e., laser output power÷pump power). Efficiencies up to 74% have been reported in a double-pass end-pump configuration (see E. Lippert et al., "Midinfrared laser source with high power and beam quality," *Applied Optics*, vol. 45, issue 16, pp. 3839-3845 (2006), which is herein incorporated by reference).

For a single end-pumped laser gain medium, the pump intensity is reduced along the longitudinal axis of the laser medium due to absorption by the laser medium of the pump energy. Therefore, the opposite end of the laser medium typically has the lowest pump intensity. Thus, in a single-pass or double-pass end-pumped three-level system, the length of the laser medium must be carefully designed in such a way that the remaining pump energy at the opposite end of the laser medium needs to be sufficiently high to overcome the re-absorption loss, which often cause that the pump energy cannot be thoroughly absorbed by the laser gain medium and subsequently lower the laser efficiency. It is desirable to further increase the efficiency and the laser output power in the three-level laser system.

BRIEF SUMMARY

A four-pass end-pumped configuration can significantly increase pump intensity inside the entire laser medium while reducing pump waste.

The present disclosure includes end-pumped solid-state lasers in which a pump beam is canted at a small angle from the longitudinal axis of the laser gain medium, the opposite end of the medium reflects the beam at a small angle from the original beam (to form a "V"), and a sharp-edge mirror or other reflective surface reflects what remains of the pump beam back through the medium to again reflect off the opposite end (back over the "V"). The pump beam thus passes four times through the laser gain medium and largely overlaps itself.

The present disclosure also includes solid state lasers in which a pump beam is directed along the longitudinal axis of the laser gain medium, or parallel to it, and an end cap at the opposite end is canted slightly with respect to the longitudinal axis so that the beam is reflected at a small (e.g. 1°, 2°) angle.

An embodiment in accordance with the present disclosure relates to a laser assembly that includes a laser gain medium having a first end, an interior, and a second end, the first end adapted to allow transmission of a pump beam through a first path within the interior, the second end adapted to reflect the pump beam through a second path within the interior at an angle from the first path, and a reflective surface configured to reflect the pump beam from the second path substantially back through the second path such that the pump beam reflects off the second end substantially back through the first path.

An embodiment can also include the above laser assembly in which the angle between the first and second paths is less than or equal to 1 degree, such that the first and second paths substantially overlap within the interior of the laser gain medium.

An embodiment can also include the above laser assembly in which a length along the paths through the interior of the laser gain medium is such that less than 1% of the pump beam power remains after four passes of the pump beam through the interior.

An embodiment can also include the above laser assembly in which the pump laser is a thulium:fiber laser, and the assembly further includes a Q-switch configured to switch laser radiation emitted from the laser gain medium, an output coupler configured to direct the laser radiation from the Q-switch, and a liquid cooling device operatively coupled to the laser gain medium.

An embodiment in accordance with the present disclosure includes a method of operating a laser assembly as described above in which the pump beam wavelength is substantially 1.9 μm, and wherein the laser radiation wavelength emitted from the laser gain medium is substantially 2.09 μm.

An embodiment in accordance with the present disclosure includes a laser assembly, including a laser gain medium having a first end and an opposing end, the first end having high transmissibility for a pump beam wavelength and high reflectivity for an emitted wavelength of the laser gain medium, the opposing end having high reflectivity for the pump beam wavelength and a high transmissibility for the emitted wavelength, means for aligning a pump beam to travel through the first end and laser gain medium and reflect off the opposing end at an angle and travel back through the laser gain medium, and a reflective surface configured to reflect the pump beam that reflected off the opposing end back whence it came, such that the beam travels back through the laser gain medium, reflects again off the opposing end, and travels again through the laser gain medium, such that the pump beam travels through the laser gain medium at least four times. The angle is sufficiently small for a given beam diameter of the pump beam such that at least four paths of the pump beam through the laser gain medium substantially overlap.

References to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION

The present disclosure describes laser assemblies including end-pumped solid-state lasers having a novel four-pass configuration. In an embodiment, a pump beam is directed at an angle to the longitudinal axis of a solid-state laser gain medium, through the laser gain medium to a reflective opposite end. The pump beam reflects off the opposite end back at an angle through the laser gain medium back to the end in which the pump beam initially passed. The pump beam then strikes a mirror or other reflective surface back into the gain medium and again to the opposite side, where it reflects again back toward the incident beam.

In another embodiment, a pump beam is directed along and/or parallel to the longitudinal axis of a laser gain medium, through the laser gain medium, and reflected by an end cap that is canted to the longitudinal axis. The pump beam reflects off the canted end cap back at an angle through the laser gain medium back to the end through which the pump initially passed. The pump beam then strikes a mirror or other reflective surface back into the gain medium and again to the opposite side with the canted end cap, where it reflects again back toward the incident beam.

Figure 1:
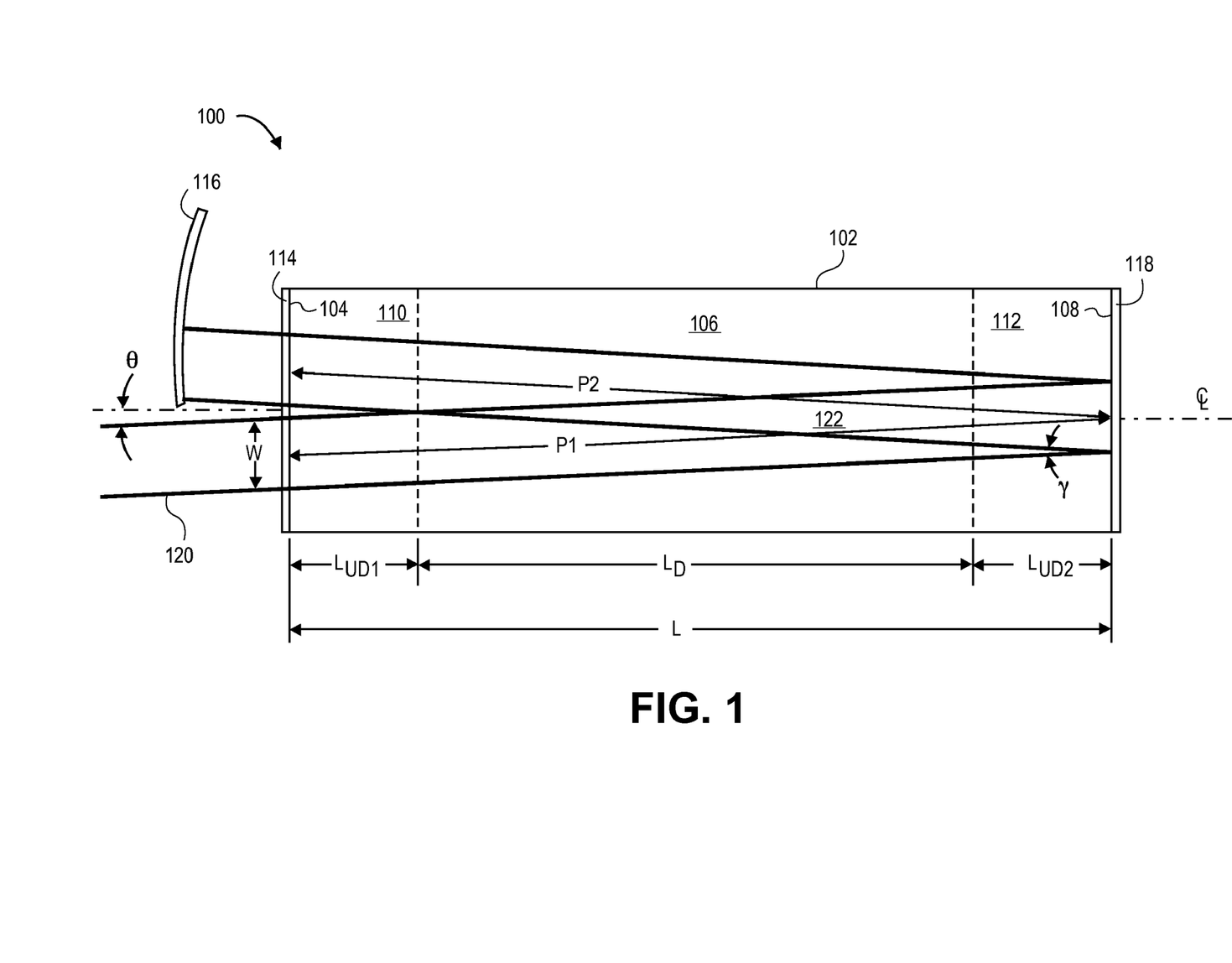
FIG. 1 illustrates a laser assembly in accordance with an embodiment.

FIG. 1 illustrates a laser assembly in accordance with an embodiment. Laser assembly 100 includes laser gain medium 102 having first end 104, interior 106, and second end 108. First end 104 is coated with coating 114 having high transmissibility for a predetermined pump beam frequency/wavelength but a high reflectivity for a predetermined emitted frequency/wavelength of the laser gain medium. Conversely, second end 108 is coated with coating 118 having high reflectivity for the predetermined pump beam frequency/wavelength and high transmissibility for the predetermined emitted frequency/wavelength of the laser gain medium.

Laser gain medium 102 has undoped regions 110 and 112. Undoped regions 110 and 112 are lengths $L_{UD1}$ and $L_{UD2}$, respectively, and the doped region is length $L_D$.

In the exemplary embodiment, undoped regions 110 and 112 of laser gain medium 102 are undoped yttrium aluminium garnet (YAG), and the doped region is holmium-doped yttrium aluminium garnet (Ho:YAG). Undoped regions 110 and 112 are bonded to the doped region without adhesive. Composite laser gain mediums and methods for joining undoped and doped regions without adhesive are discussed in U.S. Pat. No. 6,025,060, issued Feb. 15, 2000, U.S. Pat. No. 5,936,984, issued Aug. 10, 1999, and U.S. Patent Application Publication No. US 2009-0237777 A1, published Sep. 24, 2009, each of which is herein incorporated by reference in their entireties for all purposes.

In the exemplary embodiment, undoped regions 110 and 112 are 3 millimeters (mm) long (i.e., $L_{UD1}=L_{UD2}=3$ mm) and the undoped region is 12.5 mm long (i.e., $L_D=12.5$ mm). The total laser composite length is thus 18.5 mm (i.e., L=18.5 mm).

Half-round cut mirror 116, a concave spherical mirror with a reflectivity of approximately 99% at the pump wavelength and a radius of curvature of 75 mm, is positioned on one side of the longitudinal centerline of laser gain medium 102.

Pump beam 120 has incident width W and is directed at angle θ with respect to the longitudinal centerline of laser gain medium 102. Pump beam 120 travels down first path P1 toward second end 108 and reflects off coating 118. After reflecting off coating 118, pump beam 120 then travels back through laser gain medium 102 through second path P2. Paths P1 and P2 are at angle γ to each other. Angle γ is approximately equal to ≈2θ/n (i.e., γ≈2θ/n). The constant n is the refractive index of the laser gain medium. In the exemplary embodiment, n=1.805, which is the refractive index of YAG at a wavelength of 1.907 μm. The angle γ is approximately 2θ/n because refraction changes the angles of the beams. Refraction is not shown in the figure. Pump beam 120 then strikes mirror 116 and reflects back along path P2 toward second end 108. After traveling back along path P2, pump beam 120 reflects off of second end 108 back along path P1. During each pass through the laser gain medium, a portion of the pump beam energy is absorbed by the medium. Depending on the intensity of pump beam 120, there may or may not be a measurable pump beam intensity as it exits laser gain medium 102 at first end 104 due to absorption by the laser gain medium. In some embodiments, less than 1% of the pump beam power remains after the four passes through interior 106.

The figure shows exaggerated angles and is not necessarily to scale. In some embodiments, angle γ between the first and second paths is less than or equal to 1 degree, such that first and second paths P1 and P2 substantially overlap within interior 106 of laser gain medium 102, i.e., in overlap region 122.

In some embodiments, the incident pump beam is parallel to the longitudinal axis and an end cap, which is canted, reflects the beam at the opposite end.

"Substantially longitudinal" beams include beams within 1°, 5°, 10° and more of the angle of the direction of the longitudinal axis of the laser gain medium.

Paths "substantially overlap" if, for a given beam width, length, and angle γ, 50%, 66%, 75%, 80%, 90%, 95%, or more of the beam overlaps itself after reflectance.

Figure 2A:
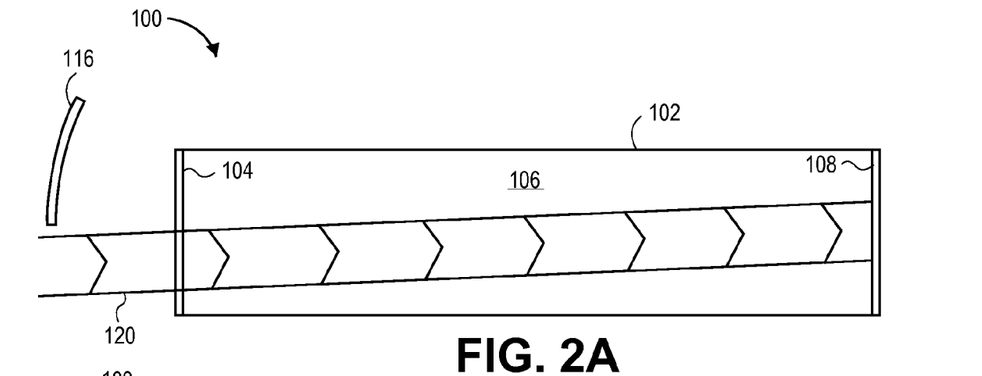
FIG. 2A illustrates a first pass of a pump beam through a first path of a laser gain medium in accordance with an embodiment.

FIG. 2A illustrates a first pass of a pump beam through a first path of a laser gain medium in accordance with an embodiment. Laser assembly 100 includes laser gain medium 102 and mirror 116. Pump beam 120 enters interior 106 of laser gain medium 102 at first end 104. Pump beam 120 travels along a first path to second end 108. Pump beam 120 can be directed at any insertion angle by mirrors and lenses among other components known in the art.

Figure 2B:
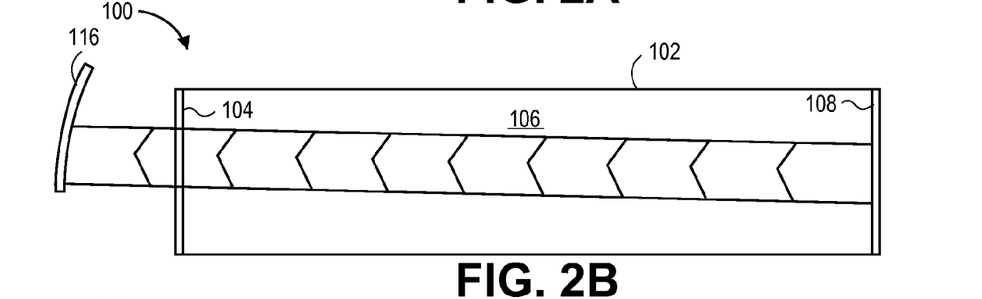
FIG. 2B illustrates a second pass of the pump beam through a second path of the laser gain medium of FIG. 2A.

FIG. 2B illustrates a second pass of the pump beam through a second path of the laser gain medium of FIG. 2A. The pump beam reflects from second end 108 and travels through interior 106 of laser gain medium 102 along a second path to first end 104. The pump beam exits laser gain medium 102 at first end 104 and strikes mirror 116.

Optionally, the first end can include an integrated reflective surface at the proper angle so that the beam does not exit the first end but instead is reflected off the first end. An integrated reflective surface can be helpful in minimizing losses at interfaces, minimizing refraction, increasing durability, and simplifying the assembly.

Figure 2C:
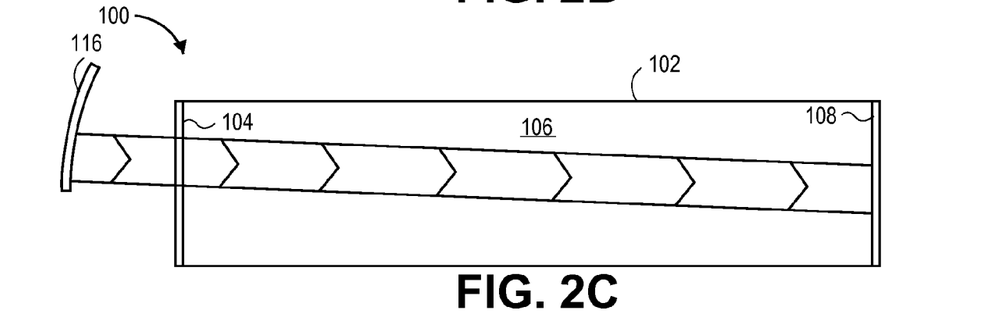
FIG. 2C illustrates a third pass of the pump beam through the second path of the laser gain medium of FIG. 2A.

FIG. 2C illustrates a third pass of the pump beam through the second path of the laser gain medium of FIG. 2A. The pump beam reflects from mirror 116 back to first end 104. The pump beam then enters interior 106 at first end 104 and travels along the second path through interior 106 of laser gain medium 102 to second end 108.

Figure 2D:
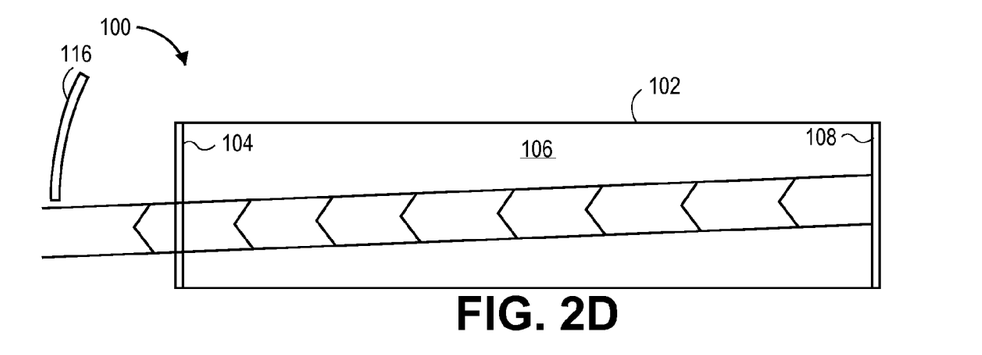
FIG. 2D illustrates a fourth pass of the pump beam through the first path of the laser gain medium of FIG. 2A.

FIG. 2D illustrates a fourth pass of the pump beam through the first path of the laser gain medium of FIG. 2A. The pump beam reflects from second end 108 and travels along the first path through interior 106 of laser gain medium 102 back to first end 104. What remains of the pump beam exits first end 104.

Figure 3A:
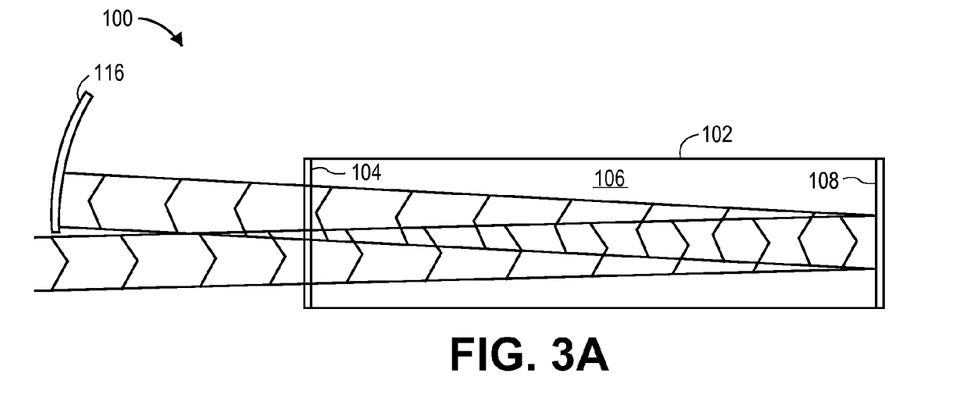
FIG. 3A illustrates first and second passes of a pump beam through first and second paths of the laser gain medium (forming a "V") in accordance with an embodiment.

FIG. 3A illustrates first and second passes of a pump beam through a laser gain medium, similar to that of FIGS. 2A-2D. The figure shows the beam forming a "V."

Figure 3B:
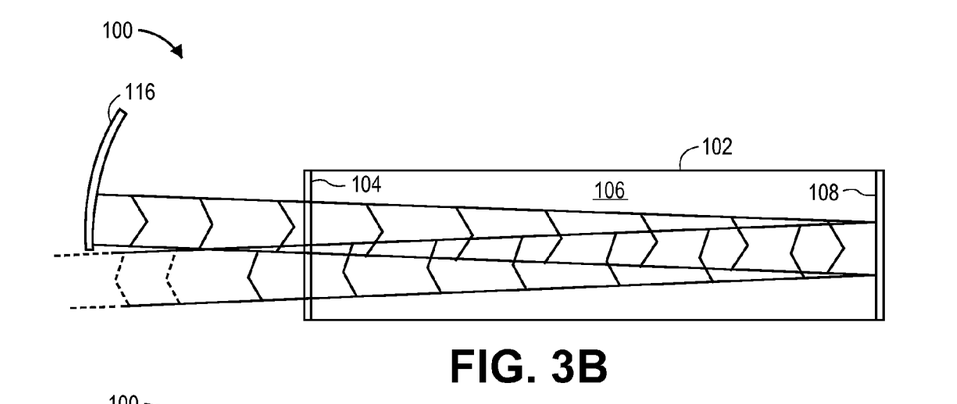
FIG. 3B illustrates third and fourth passes of the pump beam through the first and second paths of the laser gain medium (back through the "V") of FIG. 3A.

FIG. 3B illustrates third and fourth passes of the pump beam through the laser gain medium of FIG. 3A. The figure shows the beam traveling back through the "V."

Figure 3C:
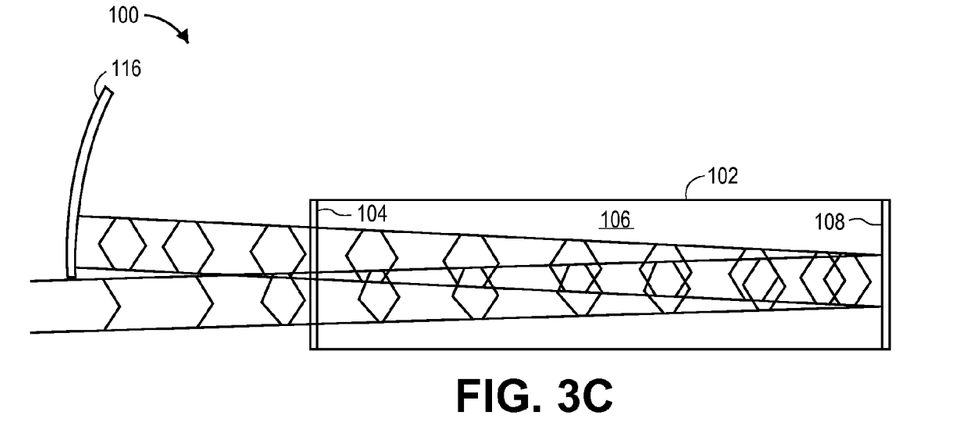
FIG. 3C illustrates the first, second, third, and fourth passes of the pump beam through the first and second paths of the laser gain medium of FIG. 3A.

FIG. 3C illustrates first, second, third, and fourth passes of the pump beam through the laser gain medium of FIG. 3A. The "V"'s from the previous figures overlap each other in time and space. The pump beams are drawn without expansion, contraction, or other natural effects for clarity of the drawings.

Figure 4:
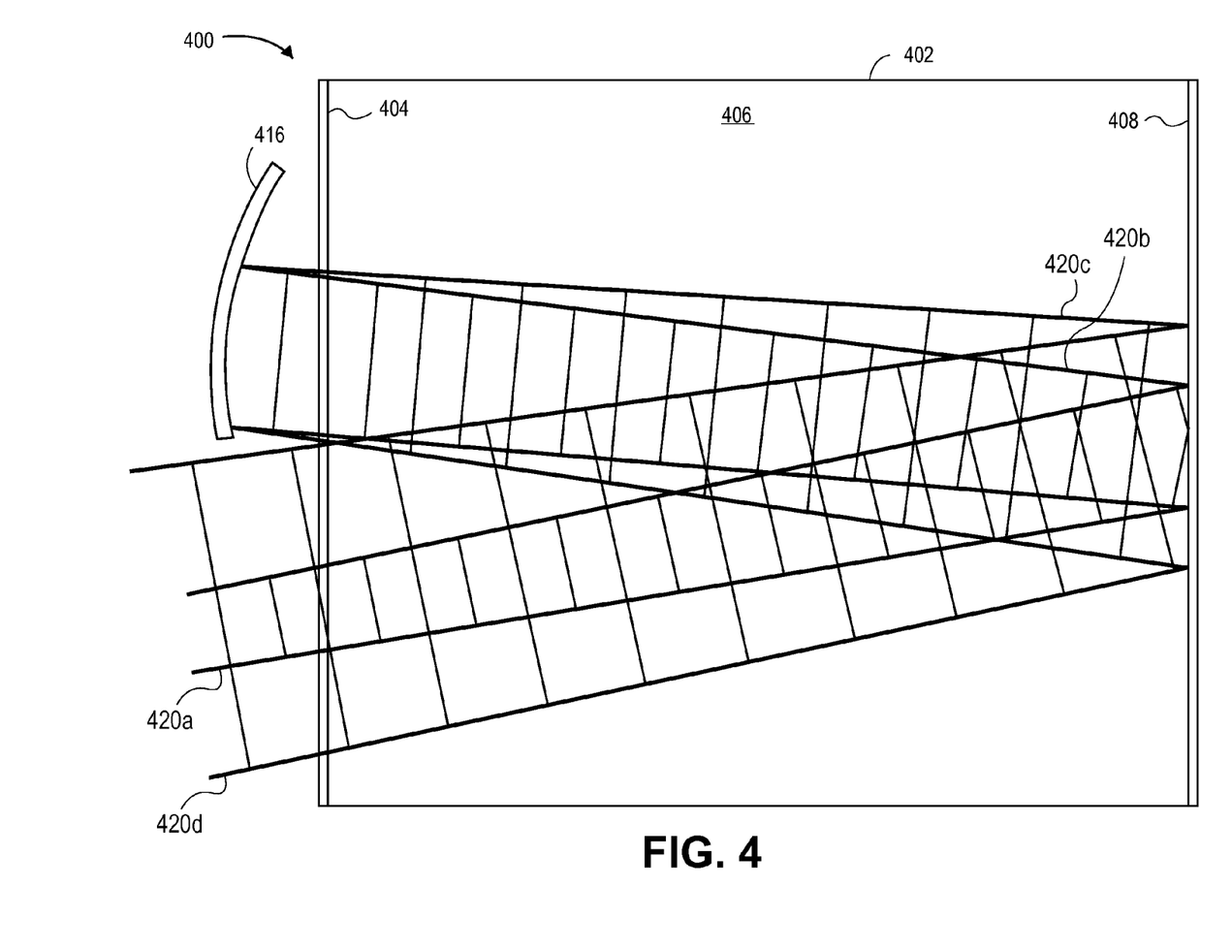
FIG. 4 illustrates first, second, third, and fourth passes of an expanding pump beam through a laser gain medium in accordance with an embodiment.

FIG. 4 illustrates first, second, third, and fourth passes of an expanding pump beam through a laser gain medium in accordance with an embodiment. Expanding pump beam 420a enters interior 406 of laser gain medium 402 at first end 404. Expanding pump beam broadens as it travels to second end 408. Expanding pump beam 420a reflects off of second end 408 to become expanding pump beam 420b. Expanding pump beam 420b reflects off of mirror 416 to become expanding pump beam 420c, and expanding pump beam 420c reflects off of second end 408 to become expanding pump beam 420d.

In this embodiment, angles and sizes are exaggerated for clarity. A pump beam can also contract along its path, for example due to focusing with a lens.

Figure 5:
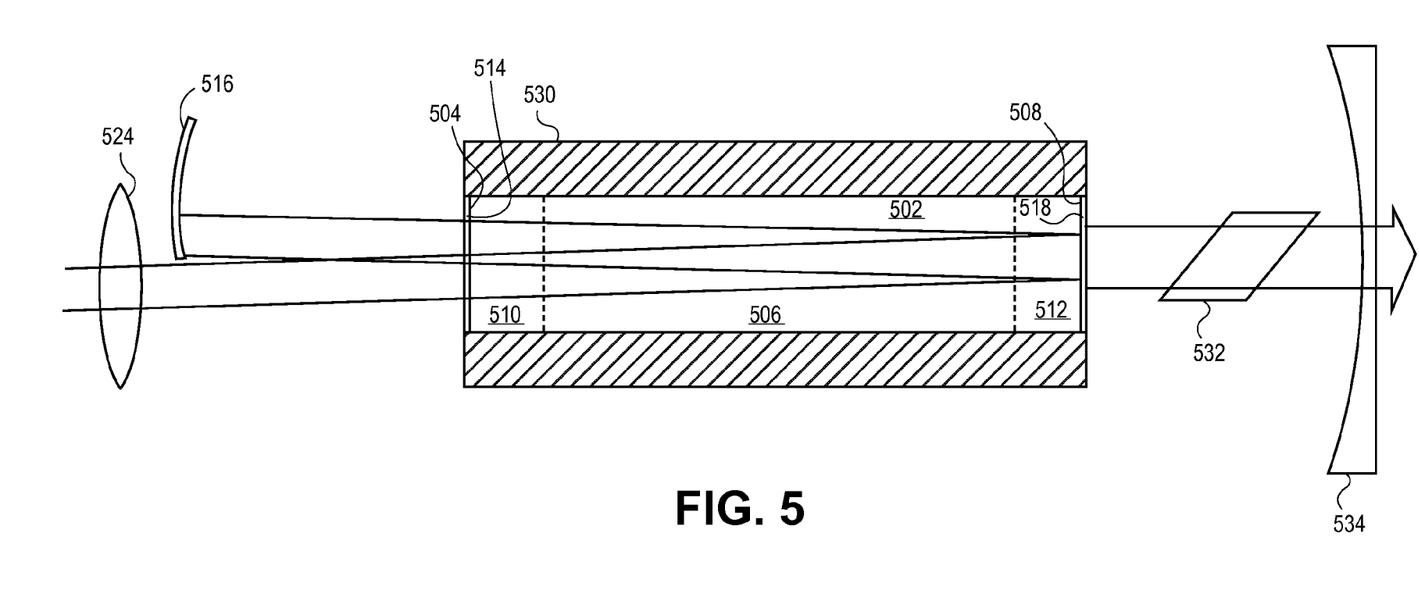
FIG. 5 illustrates a laser assembly with a Q-switch in accordance with an embodiment.

FIG. 5 illustrates a laser assembly with a Q-switch and other components in accordance with an embodiment.

Laser gain medium 502, a YAG/Ho:YAG/YAG composite, has undoped region 510, doped region 506, and undoped region 512. The Ho:YAG crystal is optimized to emit laser light at a wavelength of 2.097 μm, which is in the range of short-wavelength infrared radiation. The composite of the exemplary embodiment has a 3×3 square millimeter (mm$^2$) cross section.

A 25-watt (W) tunable unpolarized thulium-doped fiber (Tm:fiber) laser at a wavelength of 1.907 μm is used as a pump laser. The pump beam from the Tm:fiber laser is focused onto the laser composite using convex lens 524 having a focal length of approximately 75 millimeters (mm).

The laser composite has coatings 514 and 518 at ends 504 and 508, respectively. First end 504 of the composite is coated as a flat cavity mirror for high transmission (e.g. transmissibility T=99%) at the pump wavelength and high reflection (e.g. reflectivity R=99.97%) at 2.09 μm. Second end 508 of the composite is coated for high reflectivity (e.g. reflectivity R=98.7%) at the pump wavelength and high transmissibility (e.g. transmissibility T=99.99%) at 2.09 μm.

The laser composite is surrounded by water-cooled heat sink 530 for efficient heat removal.

Half-round cut mirror 516 has a radius of curvature of 75 mm and a high reflectivity (e.g., reflectivity R=99%) at 2.09 μm.

Laser radiation emitted from the composite travels through a Brewster-angle cut tellurium dioxide (TeO$_2$) acoustic Q-switch 532. Both the laser composite and Q-switch 534 are water cooled for efficient heat removal.

Output coupler 534 is a concave calcium fluoride (CaF$_2$) mirror with a radius of curvature of 75 mm. Different reflectivities of 60%, 70%, 80%, and 90% for the output coupler have been found to be effective.

Figure 6:
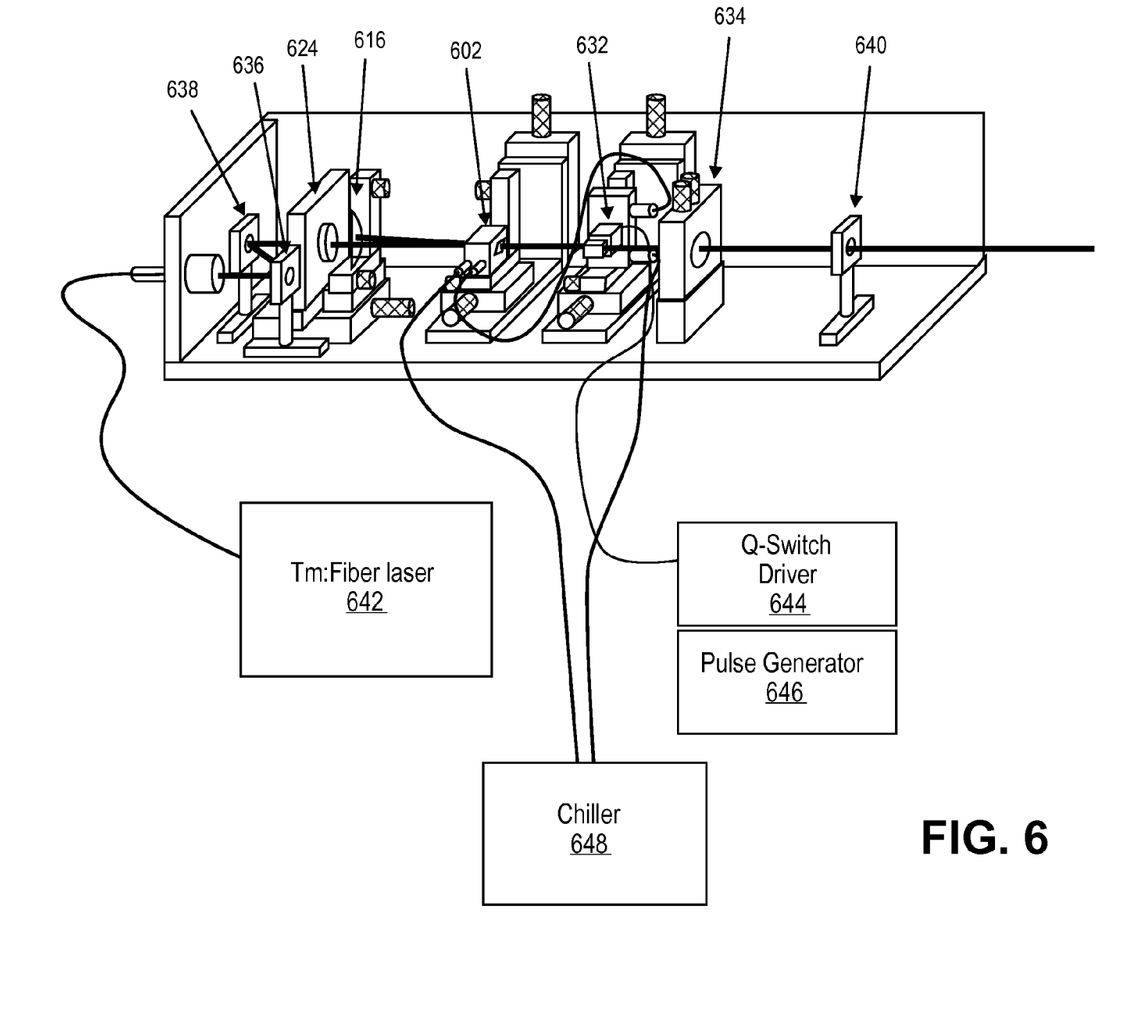
FIG. 6 is an oblique drawing of a laser assembly on a test bench in accordance with an embodiment.

FIG. 6 is an oblique drawing of a laser assembly on a test bench in accordance with an embodiment.

A pump beam from Tm:fiber laser 642 is directed at mirror 636, which reflects the pump beam to mirror 638. Mirror 638 reflects the pump beam through lens 624, which focuses the pump beam on laser gain medium 602. The pump beam reflects off of the inside right-hand end of laser gain medium 602 to sharp edge mirror 616. Sharp edge mirror 616 reflects the remaining pump beam back through laser gain medium 602, resulting in a four-pass system. The resulting laser beam is emitted from laser gain medium 602 through Q-switch 632 and output coupler 634. Laser radiation from output coupler 634 is focused through lens 640.

Chiller 648 keeps laser gain medium 602 and Q-switch 632 relatively cool. Q-switch driver 644 and pulse generator 646 are operatively coupled to Q-switch 632 for precise control on the laboratory bench.

Figure 7:
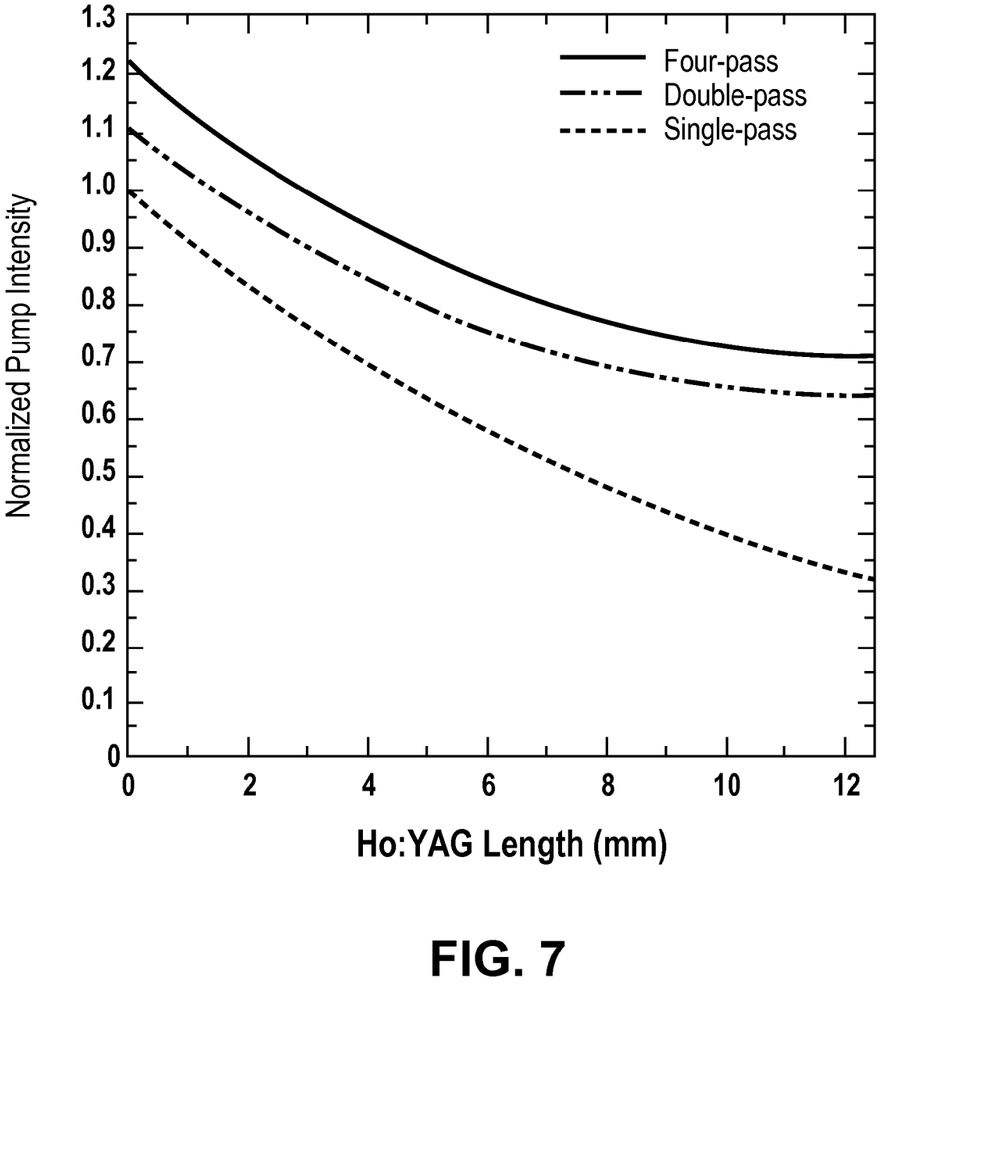
FIG. 7 is a chart plotting calculated pump intensity vs. position within a 12.5 mm-long Ho:YAG laser gain medium.

FIG. 7 is a chart plotting calculated pump intensity vs. position within a 12.5 mm-long Ho:YAG laser gain medium. An absorption coefficient of $\alpha=0.91$ cm$^{-1}$ for the laser crystal at the pump wavelength is used for the calculations. This coefficient was measured from an actual laser crystal.

In a single-pass system, the second, farthest end from the incident pump beam is not reflective at the pump beam wavelength. Thus, the pump beam makes only a single pass through the laser gain medium. In a double-pass system, the second end is reflective at the pump beam wavelength. This is done at a zero incidence angle with respect to the longitudinal axis of the laser crystal. Thus, the pump beam reflects off the second end and makes two passes through the laser gain medium. In a novel four-pass system, such as an embodiment described above, a mirror offset at an angle reflects a canted pump beam back into the medium.

Toward the first end of the Ho:YAG laser gain medium (i.e. at 0 mm) a single-pass system has an intensity of 1.0 (i.e., the normalized intensity), while a double-pass system has an intensity approximately 10% higher at 1.1. The higher intensity is presumably caused by the remains of the pump beam after it has bounced back from the far end in the double-pass system. A four-pass system has an even higher intensity at just over 1.2.

Toward the second end of the Ho:YAG laser gain medium (i.e., at 12.5 mm), a single pass system has a pump beam intensity of about a third (i.e., 0.33) of what it had at the first end. A double-pass system keeps a greater pump beam intensity throughout the medium, falling off to around 0.64 at the non-pumped, far end. A four-pass system has about the same rolloff of pump beam intensity as the double-pass system, but the overall intensity is around 10% higher throughout the laser gain medium.

Laser extraction efficiency can approach unity when pump intensity is much higher than the laser gain medium's saturation intensity. Because of this, the novel four-pass system described, along with other embodiments, is theoretically more efficient than other end pump solid-state lasers. The saturation intensity of a Ho:YAG crystal is approximately 1.2 kilowatts per square centimeter (kW/cm$^2$). For a Ho:YAG composite, the calculated pump wastes are 32%, 10%, and 1% for the single-pass, double-pass, and four-pass pump arrangements. That is, only 1% of the pump energy is wasted in the novel four-pass arrangement.

Figure 8:
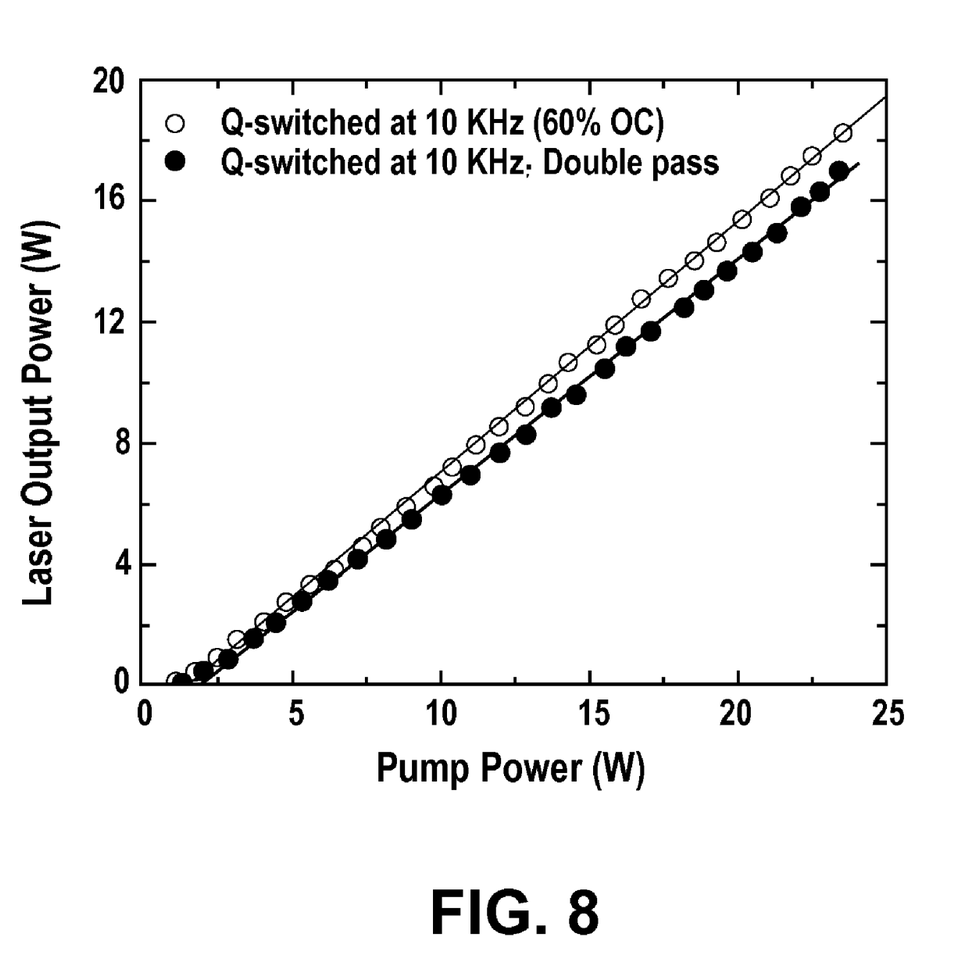
FIG. 8 is a chart plotting empirically-measured laser output power vs. pump power for a four-pass embodiment and a double-pass end-pumped laser.

FIG. 8 is a chart plotting empirically-measured laser output power vs. pump power for a four-pass embodiment and a double-pass end-pumped laser.

As apparent from the figure, laser output power increases linearly with pump power for the power range shown. This is sometimes called the "slope efficiency."

The slope efficiency of a double-pass arrangement has been measured to be 75% (pump power of 23.7 W, 10 kHz repetition rate, resulting in 16.9 W average output laser power). The slope efficiency of a four-pass pump arrangement according to one embodiment has been measured to be 81.2% (pump power of 23.7 W, 10 kHz repetition rate, resulting in 18.6 W average output laser power). Thus, the slope efficiency of an end-pumped laser has been increased by 6% by using a novel four-pass arrangement as opposed to a double-pass arrangement. The beam quality of the laser output is very close to a Gaussian energy distribution and has a beam quality factor of M$^2$ of 1.2, where an M$^2$ value of 1 is a perfect Gaussian beam. The M$^2$ factor of a laser indicates the extent to which the beam can remain focused for a given divergence angle.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A laser assembly, comprising:
    a laser gain medium having a first end, an interior, and a second end, the first end adapted to allow transmission of a pump beam through a first path within the interior, the second end adapted to reflect the pump beam through a second path within the interior at a non-zero angle from the first path; and
    a reflective surface configured to reflect the pump beam from the second path substantially back through the second path such that the pump beam reflects off the second end substantially back through the first path,
    wherein the non-zero angle between the first and second paths is less than or equal to 1 degree, such that the first and second paths substantially overlap within the interior of the laser gain medium.

2. The assembly of claim 1 wherein a length along the paths through the interior of the laser gain medium is such that less than 2% of the pump beam power remains after four passes of the pump beam through the interior.

3. The assembly of claim 1 wherein the laser gain medium is elongated and the pump beam paths are substantially longitudinal through the medium.

4. The assembly of claim 1 further comprising:
    undoped end caps at the first and second ends of the laser gain medium.

5. The assembly of claim 4 wherein the end caps are bonded to the respective ends without inorganic or organic adhesive.

6. The assembly of claim 1 wherein the reflective surface comprises a mirror having a reflectivity greater than 95% at a wavelength of the pump beam.

7. The assembly of claim 6 wherein the reflective surface comprises a sharp-edged mirror.

8. The assembly of claim 6 wherein the reflective surface comprises a spherical mirror.

9. The assembly of claim 1 wherein the laser gain medium is substantially solid state.

10. The assembly of claim 1 wherein the laser gain medium comprises a holmium-doped yttrium aluminium garnet (Ho:YAG).

11. The assembly of claim 1 wherein the laser gain medium comprises a garnet selected from the group consisting of a neodymium-doped yttrium aluminium garnet (Nd:YAG), neodymium and chromium-doped YAG (Nd:Cr:YAG), erbium-doped YAG (Er:YAG), ytterbium-doped YAG (Yb:YAG), neodymium-cerium double-doped YAG (Nd:Ce:YAG), holmium-chromium-thulium triple-doped YAG (HO:Cr:Tm:YAG), thulium-doped YAG (Tm:YAG), chromium (IV)-doped YAG ($Cr^{4+}$:YAG), dysprosium-doped YAG (Dy:YAG), samarium-doped YAG (Sm:YAG), terbium-doped YAG (Tb:YAG), cerium(III)-doped YAG (Ce:YAG), and thulium-doped $Lu_3Al_5O_{12}$ crystal garnet (Tm:LuAG).

12. The assembly of claim 1 wherein the laser gain medium comprises a material selected from the group consisting of yttrium vanadate, yttrium lithium fluoride, yttrium aluminate, sapphire, zinc sulfide, zinc selenide, optical ceramics, phosphate laser glasses, fluoride laser glasses, and silicate laser glasses.

13. A system incorporating the assembly of claim 1, comprising:
   a pump laser configured to transmit the pump beam along the first path.

14. The assembly of claim 13 wherein the pump laser is a thulium:fiber laser, the assembly further comprising:
   a Q-switch configured to switch laser radiation emitted from the laser gain medium;
   an output coupler configured to direct the laser radiation from the Q-switch; and
   a conductive or convective cooling device operatively coupled to the laser gain medium.

15. The assembly of claim 14 wherein the pump beam has a wavelength ($\lambda$) that is about 1.9 μm, and wherein the laser radiation emitted from the laser gain medium has a wavelength that is about 2.09 μm.

16. The assembly of claim 1 in operation by:
   pumping the pump beam through the laser gain medium at a power higher than a lasing threshold of the laser gain medium such that laser radiation is generated from the laser gain medium.

17. A laser assembly, comprising:
   a laser gain medium having a first end and an opposing end, the first end having high transmissibility for a pump beam wavelength and high reflectivity for an emitted wavelength of the laser gain medium, the opposing end having high reflectivity for the pump beam wavelength and a high transmissibility for the emitted wavelength;
   means for aligning a pump beam to travel through the first end and laser gain medium through a first path and reflect off the opposing end at a non-zero angle and travel back through the laser gain medium; and
   a reflective surface configured to reflect the pump beam that reflected off the opposing end back whence it came, such that the beam travels back through the laser gain medium, reflects again off the opposing end, and travels again through the laser gain medium through the first path, such that the pump beam travels through the laser gain medium at least four times,
   wherein the non-zero angle is 1 degree or less and sufficiently small for a given beam diameter of the pump beam such that at least four paths of the pump beam through the laser gain medium substantially overlap.

18. The assembly of claim 17 in operation by:
   pumping the pump beam through the laser gain medium at a power higher than a lasing threshold of the laser gain medium such that laser radiation is generated from the laser gain medium.

19. The assembly of claim 17 wherein the pump beam wavelength ($\lambda$) is about 1.9 μm, and wherein the emitted wavelength of the laser gain medium is about 2.09 μm.

* * * * *